(12) United States Patent
Sawamoto

(10) Patent No.: US 8,526,951 B2
(45) Date of Patent: Sep. 3, 2013

(54) HANDOVER SYSTEM

(75) Inventor: Toshiro Sawamoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 979 days.

(21) Appl. No.: 11/902,875

(22) Filed: Sep. 26, 2007

(65) Prior Publication Data

US 2008/0026759 A1    Jan. 31, 2008

Related U.S. Application Data

(63) Continuation of application No. PCT/JP2005/005959, filed on Mar. 29, 2005.

(51) Int. Cl.
*H04W 36/00*    (2009.01)
*H04W 4/00*    (2009.01)

(52) U.S. Cl.
USPC ............ 455/436; 455/439; 455/443; 370/331

(58) Field of Classification Search
USPC .......................... 455/436, 439, 442; 370/331
See application file for complete search history.

(56) References Cited

U.S. PATENT DOCUMENTS

| | | | |
|---|---|---|---|
| 6,650,686 | B1 | 11/2003 | Kondo |
| 7,123,913 | B2 | 10/2006 | Akao et al. |
| 2002/0028689 | A1 | 3/2002 | Iwami et al. |
| 2002/0122396 | A1* | 9/2002 | Terasawa ........................ 370/331 |
| 2003/0176189 | A1* | 9/2003 | Merson et al. ................ 455/436 |
| 2005/0073975 | A1* | 4/2005 | Chen et al. .................... 370/331 |

FOREIGN PATENT DOCUMENTS

| | | |
|---|---|---|
| CN | 1352865 | 6/2002 |
| CN | 1433646 | 7/2003 |
| EP | 1 107 483 A1 | 6/2001 |
| EP | 1 225 707 A1 | 7/2002 |
| JP | 11-275645 | 10/1999 |
| JP | 2001-111456 A | 4/2001 |
| JP | 2001-237769 | 8/2001 |
| JP | 2001-522212 A | 11/2001 |
| JP | 2002-191068 | 7/2002 |
| JP | 2002-540694 | 11/2002 |

(Continued)

OTHER PUBLICATIONS

Notice of Preliminary Rejection for the corresponding Korean Patent Application No. 10-2007-7021823. Dated May 29, 2009. Complete English translation attached.

(Continued)

*Primary Examiner* — George Eng
*Assistant Examiner* — Jing Gao
(74) *Attorney, Agent, or Firm* — Myers Wolin, LLC

(57) ABSTRACT

A base station of a mobile device's movement destination receives a diversity handover (DHO) start notification from a mobile station at the beginning of a DHO. This notifies a radio network control apparatus and an instruction is issued to the base station to add a radio link. The time for transmitting data to a mobile device is determined, the transmission timing is rounded up, and the data is transmitted from the base station to a mobile device. In this event, a search window's timing for receiving data from the mobile device is shifted with the round up of the transmission timing; and therefore the width of the search window is enlarged. The movement destination's base station also receives a DHO complete notification from a mobile device at the completion of the DHO. The movement destination's base station changes the width of the width-enlarged window back to the original width.

9 Claims, 10 Drawing Sheets

(56) References Cited

FOREIGN PATENT DOCUMENTS

| | | |
|---|---|---|
| JP | A-2003-110493 | 4/2003 |
| JP | 2003-516060 | 5/2003 |
| JP | A-2003-244742 | 8/2003 |
| WO | WO 99/23847 | 5/1999 |
| WO | WO 00/57664 | 9/2000 |
| WO | 01/41482 | 6/2001 |
| WO | WO 01/41482 A1 * | 6/2001 |
| WO | WO 02/21743 A1 | 3/2002 |

OTHER PUBLICATIONS

The State Intellectual Property Office of China "First Office Action" for corresponding Chinese Patent Application No. 200580049290.8, issued Jul. 29, 2010. English translation attached.

Japanese Patent Office "Notice of Rejection Grounds" for corresponding Japanese Patent Application No. 2007-510275, mailed Jul. 27, 2010. Partial English translation attached.

Supplementary European search report issued for corresponding European Patent Application No. 05727627.1 dated Jun. 8, 2012.

Etri, "Seamless Intel-Frequency Hard Handover", Agenda Item: AdHoc #, 3GPP TSG RAN WG1, TSGR1#19(01)190, Las Vegas, CA, Feb. 27-Mar. 2, 2001.

3GPP TS 25.402 V6.2.0 (Mar. 2005), 3rd Generation Partnership Project; Technical Specification Group Radio Access Network; Synchronisation in UTRAN Stage 2 (Release 6), Mar. 2005.

European Office Action issued for corresponding European Patent Application No. 05727627.1, dated May 2, 2013.

* cited by examiner

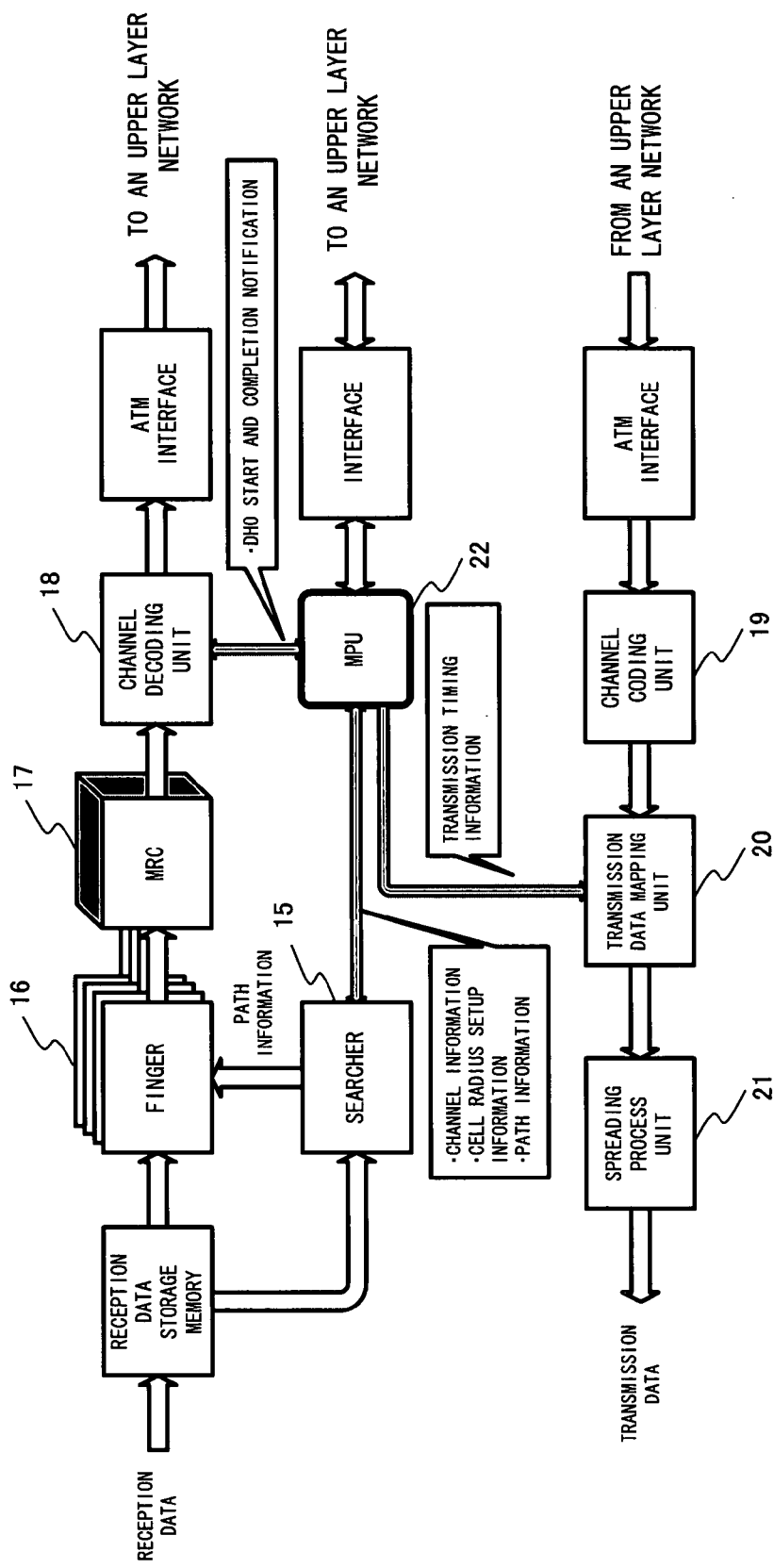
F I G. 3

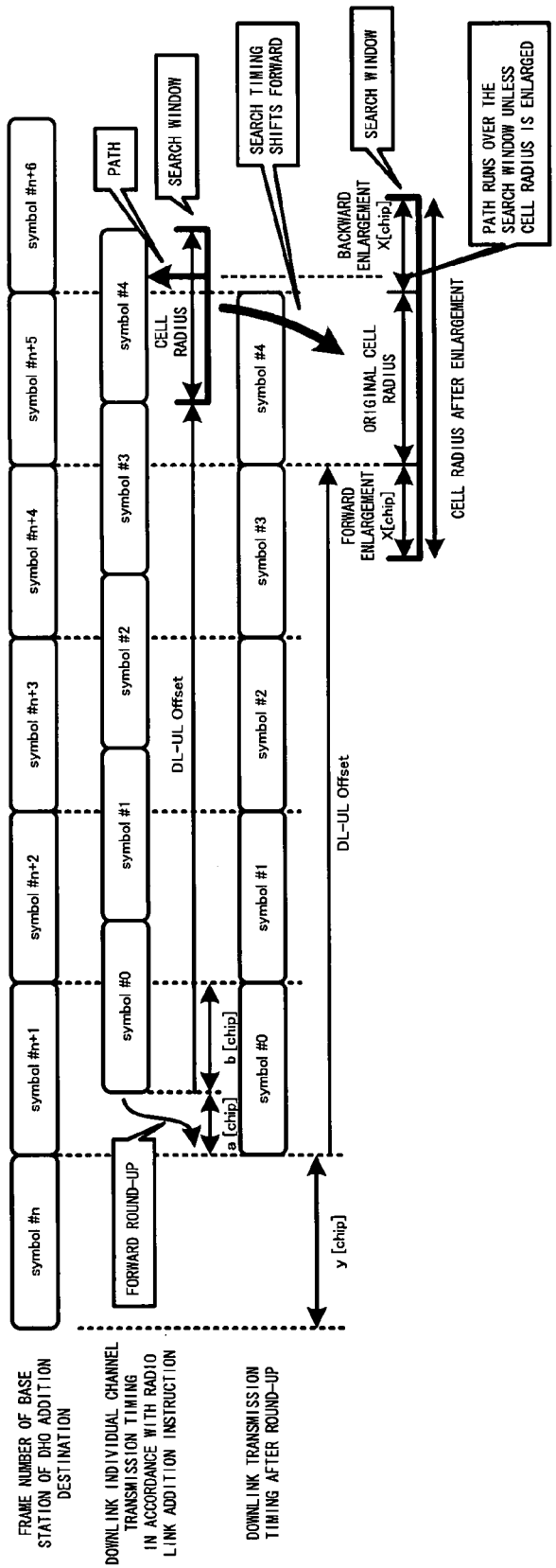
F I G. 4

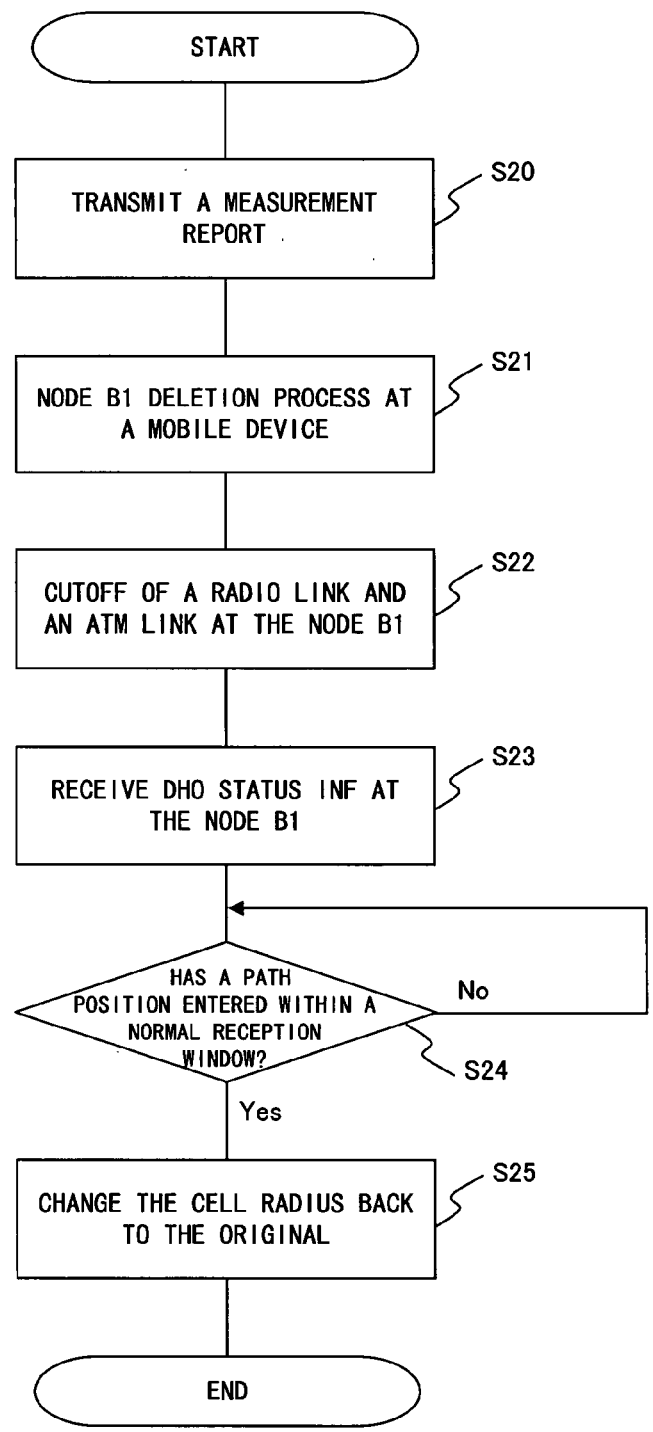
F I G. 8

HANDOVER SYSTEM

CROSS REFERENCE TO RELATED APPLICATION

This application is a continuation of PCT application of PCT/JP2005/005959, which was filed on Mar. 29, 2005.

BACKGROUND OF THE INVENTION

1. Field of the Invention

The present invention relates to an asynchronous handover (DHO: diversity handover) system between base stations for use in a radio telecommunication system.

2. Description of the Related Arts

FIG. 1 is a diagram describing the timing for transmitting and receiving data in a conventional handover system.

Referring to FIG. 1, the BTS (Base Transceiver Station) 1 is a base station wherein a mobile station MS is initially engaged in a telecommunication, and the SFN (System Frame Number) 1 and DPCCH (Dedicated Physical Control Channel) 1 show transmission timings of data transmitted from the BTS 1. The BTS 2 is a base station wherein the mobile station MS begins a telecommunication, and the BTS 2 transmits SFN 2 and Rounded (DL DPCCH 2) transmission timings of data. The DPCCH 1 and DPCCH 2, which are parenthesized as "MS", show timings of a mobile station MS receiving respective pieces of data transmitted from a BTS 1 and a BTS 2.

The mobile station MS moves from the DHO origin base station BTS 1 to the DHO destination base station BTS 2. Numeral (1) shows a frame number specific to the BTS 1. Downlink specific control channels are transmitted when the results of the Frame Offset and Chip Offset are added to numeral (1). This signal reaches the mobile station after a propagation delay PD1, at the time indicated by numeral (3). The mobile station adjusts the window timing so that the path from a base station (i.e., BTS 1 according to FIG. 1), which has the largest reception power of the plurality of base stations, arrives at the center of a search window. The mobile station transmits an uplink signal at a time indicated by numeral (5), in a prescribed timing offset from the timing of numeral (4). Meanwhile, the BTS 1 opens a search window at the time indicated by numeral (6), in a prescribed timing offset (which is the same as the mobile station). This is done after the timing indicated by numeral (2), so as to be on standby for a mobile station's uplink signal path. The uplink signal transmitted at the aforementioned timing in numeral (5) is received at the base station at the time indicated by numeral (6) by way of a propagation delay PD1.

A mobile station keeps monitoring downlink signals from a plurality of base stations and, if a base station (or a sector) emerges having reception power that exceeds a threshold value, the mobile station starts a handover process.

In the following description, it is assumed that the reception level from the BTS 2 exceeds a reception power threshold value set at the mobile station, and starts a handover process. In this event, the mobile station calculates the BTS's 2 downlink transmission timings using the following method so that the path from the BTS 2 arrives at the center of the mobile station's search window.

The BTS 2 has a frame number shown in numeral (7). Since this is specific to an individual base station, it is asynchronous. The frame number is received by the mobile station, by way of a propagation delay, at the time indicated by numeral (8). The mobile station calculates the difference between the head of the BTS 2 frame number and the reception of the timing from a downlink specific ch (i.e., DPCCH1) with expression (9). The mobile station notifies an upper layer apparatus of this parameter, and the upper layer apparatus in turn notifies the BTS 2 of the timing difference reported by the mobile station. Incidentally, if the BTS 2 transmits the frame number at the time indicated by numeral (10), by applying a transmission timing that is reported from the upper layer apparatus, then the path arrives at the position in numeral (4). This enables the path to be captured in a limited search window, which is very convenient for the mobile station.

FIG. 1 is an example of rounding up to an earlier timing. Because the base station needs to maintain orthogonality of despreading codes between each transmission channel, it must round up a downlink transmission timing to a despreading code border without failing. In an asynchronous inter-base station handover, which is carried out for the code division multiple access (CDMA) system, the round up process is always required. As a result of the round up process, the transmission timing changes to numeral (11), and the uplink signal reception timing changes from numeral (12) to numeral (13) at the same time.

In case of a forward round up, there is a case of a mobile station's path timing (indicated by numeral (14)) running over the back of a reference reception timing, thus requiring a countermeasure. Inversely, in the case of a backward round up, the path timing numeral (14) may run over forward.

That is, when performing a handover (DHO) between radio telecommunication base stations in a radio telecommunication method, a mobile station's path may exceed a reference timing for reception (cell radius: the larger the cell radius, the larger the delay of reception data, thereby causing possible large differences in reception timings, and possible reception data timings running over the reception window) (hereinafter noted as "reception reference timing") because the base station's frame numbers are asynchronous. Therefore, the base station is required to change or enlarge a reception reference timing appropriately in accordance with the arrival timing (i.e., path) of a signal from a mobile station, so as to track the operations.

Meanwhile, it is not possible for a base station to judge whether a mobile station is in a DHO state, or the DHO has been completed, because the mobile station does not send a completion report when the DHO is completed. Accordingly the base station is required to continue telecommunication in the DHO state forever, thus resulting in a waste of resources and processes, and an inability to measure an accurate propagation time to the mobile station.

Reference patent document 1 discloses a CDMA receiver capable of flexibly tracking a mobile station during a DHO without requiring a complicated equipment configuration.

However, in the conventional technique, there has been no invention related to a method for accomplishing a detail process when a DHO is between asynchronous radio base stations. For example, even with the contents of patent document 1 noting that "a reference reception timing is adjusted at the time of a DHO between asynchronous base stations", there has been no invention to specifically describe how it is adjusted. Nor has there been any invention focusing on the completion of a DHO, thus requiring an extraneous process and resources upon completing a DHO, thereby causing inefficiency.

Patent document 1: Laid-Open Japanese Patent Application Publication No. 2001-111456

SUMMARY OF THE INVENTION

The object of the present invention is to provide a simply comprised handover system to solve the problem of a signal from a mobile station running over a reception reference timing, which occurs when a DHO is between asynchronous radio base stations, and the problem of a post-process at the completion of a DHO (i.e., reverting a reception reference timing back to an original timing).

The handover system according to the present invention comprises a notification reception unit for receiving a notification that indicates the start of a mobile device's handover and one indicating the completion of the handover. The handover system further comprises a window width variation unit for enlarging the width of a search window that receives data from a mobile device after receiving a notification indicating the start of the handover. Additionally, the window width variation unit may reduce the width of the search window that receives data from the mobile device after receiving a notification indicating the completion of the handover.

BRIEF DESCRIPTION OF DRAWINGS

FIG. 3 is a diagram showing a preferred embodiment of a radio telecommunication base station;

FIG. 4 is a diagram showing an example of rounding up a downlink transmission timing at an additional destination's base station and a method for enlarging a cell radius (exemplifying a forward round up);

FIG. 8 is a flowchart diagram showing the overall process of a preferred embodiment of the present invention (part 2);

DESCRIPTION OF THE PREFERRED EMBODIMENTS

Figure 1:
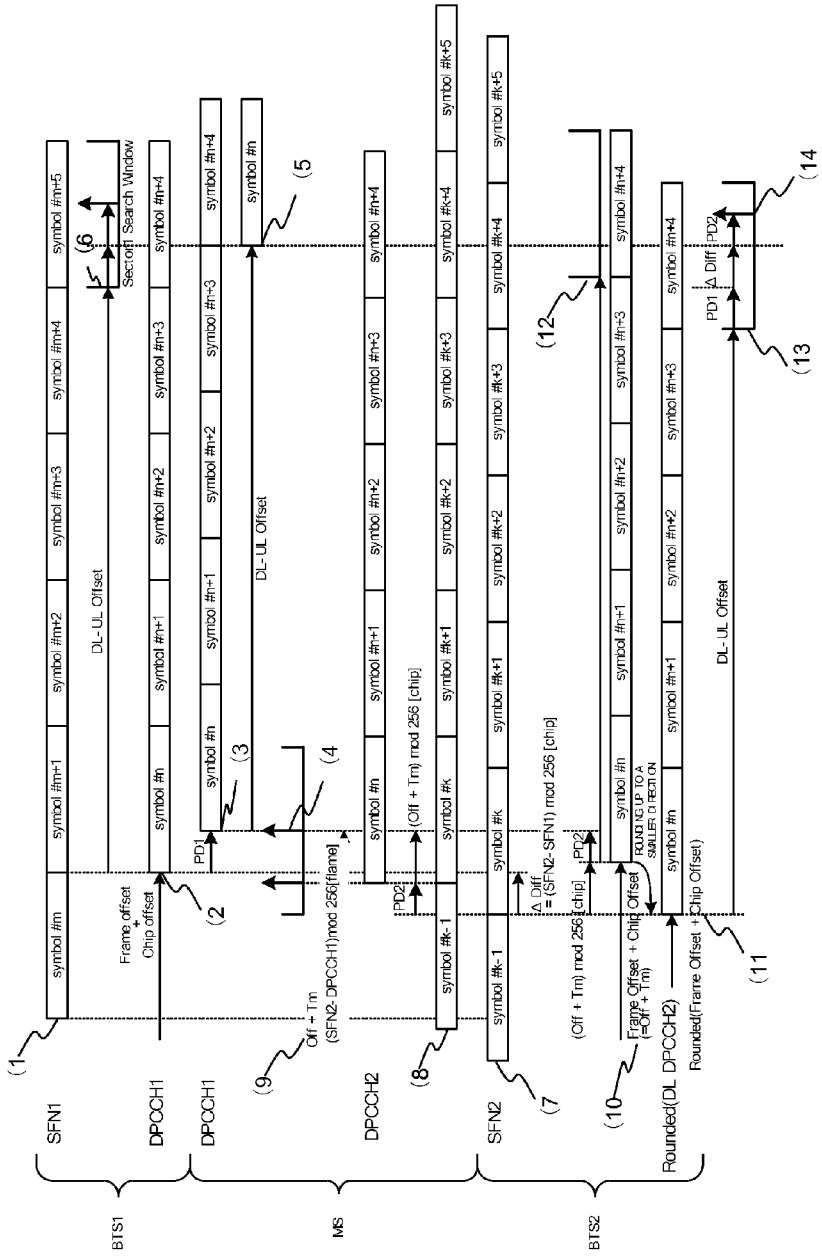
FIG. 1 is a diagram describing a timing for transmitting and receiving data at the time of a DHO.

A preferred embodiment of the present invention is configured to receive a DHO start notification from a mobile device, or an upper layer apparatus, at a radio base station during a DHO. A base station starts a telecommunication (also abbreviated as "telecom") with a mobile device and receives a radio link addition instruction from an upper layer apparatus without exception; therefore, the base station adds the DHO start notification to the present instruction. Also required is a notification to the base station (which has thus far been engaged in the telecom.) When receiving the notification from the mobile device, it is possible to add the DHO start notification to one of the lower layer signals.

Meanwhile, having received a DHO start notification from an upper layer apparatus, or mobile device, the base stations (i.e., both of the base stations have thus far been engaged in the telecom and one of the base stations started the telecom) extend an uplink data reception section (i.e., a cell radius=the width of a reception window) by a X [chip]. A secure capture of a path becomes possible by extending the search area, in advance, to a range in which a path moves during a DHO.

If a downlink transmission timing's round up process is carried out at a base station (starting the telecom from the time of a DHO) the search window's range of extension is discerned from the direction of the round up, and the search window is enlarged by a X [chip] at the base station when starting a telecom. The search window is extended forward when rounding up toward an earlier timing and the search window is extended backward when rounding up toward a later timing.

If a downlink transmission timing's round up process is carried out at a base station (starting the telecom from the time of the DHO) a search window's range of extension is discerned from the direction of the round up, and the search window is enlarged by a X [chip] at the base station, which has thus far been engaged in telecom. The search window is extended forward when rounding up toward an earlier timing and the search window is extended backward when rounding up toward a later timing. The base station, which has thus far been engaged in the telecom, needs to receive a round up calculation result at the base station that started the telecom by way of an upper layer apparatus.

After a base station is eventually left with a link, it receives a completion notification from a mobile device, or upper layer apparatus, and carries out a completion judgment within a base station.

It then changes the size of the cell radius in the above description back to the original size based on the DHO completion result. Since an enlarged cell radius increases the path detection's process volume, it needs to change it back to the original size.

The configuration described above eliminates the need for a base station to predict whether a mobile station is in the process of a DHO, thereby making it possible to drastically reduce call cutoffs during a DHO due to failed path detection. Also a minimum amount of processing is required, thereby preventing increased process volume or circuit size.

Figure 2:
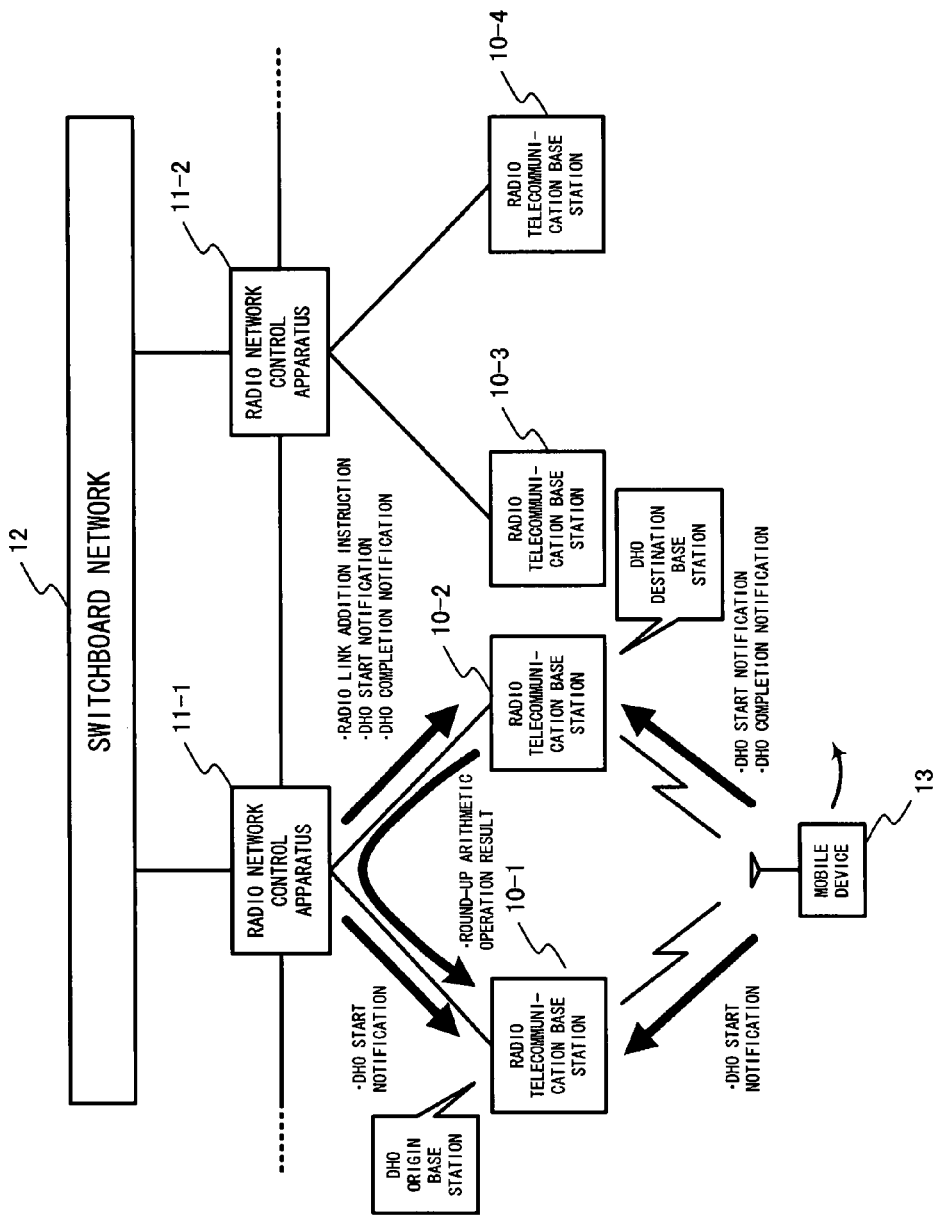
FIG. 2 is a diagram showing the flow of DHO information within a network according to a preferred embodiment of the present invention.

FIG. 2 is a diagram showing one configuration for connecting a radio base station apparatuses to an upper layer radio network control apparatuses.

A plurality of radio telecommunication base station apparatuses 10-1 through 10-4 are connected to radio network control apparatuses 11-1 and 11-2, whereby the plurality of radio telecommunication base station apparatuses 10-1 through 10-4 hang from the radio network control apparatuses 11-1 and 11-2. The radio network control apparatuses 11-1 and 11-2, which are also connected to a switchboard network 12 on the more upper layer, and to another radio network control apparatus, carry out the management of radio resources and control radio telecommunication base station apparatuses 10-1 through 10-4 (e.g., a handover control).

In the embodiment set forth in FIG. 2, the mobile device 13 is initially engaged only in a telecommunication with the radio telecommunication base station apparatus 10-1. The mobile device 13 then changes its position to move to an intermediate position between the radio telecommunication base station apparatuses 10-1 and 10-2, thereby becoming a DHO state. It further changes its position to move to the proximity of the radio telecommunication base station apparatus 10-2. Eventually it cuts off the call via a radio telecommunication base station apparatus 10-1 and continues the telecom with only the radio telecommunication base station apparatus 10-2. The radio network control apparatuses 11-1 and 11-2 correspond to BTS 1 and BTS 2, respectively, shown in FIG. 1.

In this event, the preferred embodiment of the present invention is configured such that the mobile device 13 transmits a DHO start notification to the radio telecommunication base station apparatuses 10-1 and 10-2. The DHO start notification notifies the radio network control apparatus 11-1, and then notifies the radio telecommunication base station apparatuses 10-1 and 10-2. Meanwhile, the radio network control apparatus 11-1 uses a radio link addition instruction to notify the radio telecommunication base station apparatus 10-2. Then, from the radio telecommunication base station apparatus 10-2 to 10-1 a round up arithmetic operation result is notified. When the mobile device 13 cuts off the telecommunication with a radio telecommunication base station apparatus 10-1, a DHO completion notification is transmitted from the mobile device 13 to the radio telecommunication base station apparatus 10-2. A DHO completion notification is also transmitted to a radio network control apparatus 11-1.

Note that the present configuration carries out an information exchange between the radio telecommunication base station apparatuses (e.g., a round up arithmetic operation result notification) by way of a radio network control apparatus. However, an exchange of information between a pair of radio base station apparatuses, such as those that comprise a part of the radio network control apparatus's function, can be carried out directly between the radio base station apparatuses without requiring an intervention by a radio network control apparatus.

FIG. 3 is a diagram exemplifying a preferred embodiment of the present invention.

FIG. 3 exemplifies a baseband signal process unit within a radio telecommunication base station, having an uplink comprising a search unit 15 for carrying out a path detection for reception data, a finger unit 16 for carrying out an inverse diffusion/channel estimation, an MRC unit 17 for carrying out a maximum ratio synthesis, and a channel decode unit 18. Meanwhile, the downlink comprises a channel coding unit 19, a transmission data mapping unit 20 for carrying out a mapping of the coded data to a radio frame, and a diffusion process unit 21 for carrying out a diffusion of the mapped data.

An MPU 22 executes a control of the uplink and downlink process block. Additionally, an MPU 22 manages a receiving channel, a series of arithmetic operations such as transmission and reception timing calculations, and an exchange of signals with the upper layer network (i.e., the radio network control apparatus).

The present embodiment is configured to receive a radio link addition instruction notified from the radio network control apparatus to the destination base station by the MPU 22 in FIG. 3, and set the uplink and downlink process blocks. Also the origin of the movement and destination base stations receive a DHO start notification and recognize if they are a movement destination base station.

Meanwhile, in the case of receiving a DHO start notification from a mobile device, the notification is extracted from lower layer data after a channel decoding.

Having received the DHO start notification, the base station enlarges the data reception range (i.e., a cell radius=the width of a search window) to an X [chip] (N.B.: the X is a value to be appropriately set by a designer) by more than a specified value. The value of X depends on the amount of round up of a downlink transmission timing at the movement destination base station.

Figure 5:
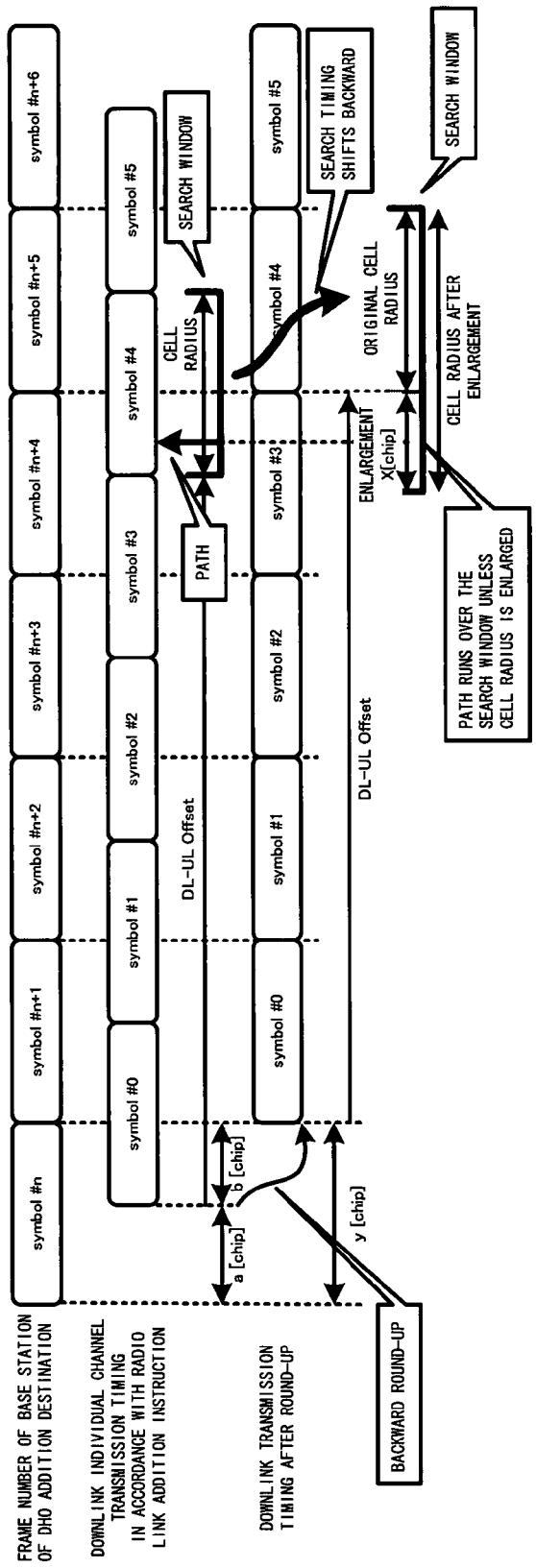
FIG. 5 is a diagram showing an example of rounding up a downlink transmission timing at an additional destination's base station and a method for enlarging a cell radius (exemplifying a backward round up)

FIGS. 4 and 5 are diagrams showing examples of rounding up a downlink transmission timing and of a method for enlarging a cell radius.

In the present example, each downlink data symbol shows a spreading code border. Without exception, a wideband CDMA (W-CDMA) system's radio telecommunication base station transmits data with a spreading code border as a separation to maintain an orthogonality of downlink spreading code between individual channels. Therefore, if a transmission timing is specified by an upper layer for a DHO timing other than a spreading code border, a roundup is necessary without exception. FIG. 4 shows an example of a round up, wherein the method rounds up to a closer spreading code border. That is, a forward round up is carried out because a [chip]<b [chip]. Contrarily, an uplink reception search window is opened at a prescribed offset (i.e., UL-DL Offset) from a downlink transmission timing. Therefore, if a downlink transmission timing is changed by a round up, it results in changing the uplink search window timing by the same amount. This causes a timing arrangement between the base station and mobile device to be disturbed, possibly resulting in a path running over the search window. Therefore, it is necessary to enlarge a cell radius (i.e., the search window width on the base station side) (see FIG. 4) so as to prevent the path from running over the search window. Particularly, the X [chip] in the front and back of the original cell radius is enlarged. The X indicates a maximum amount of a round up. When carrying out the round up shown in FIG. 4, X=y/2 [chip]. All of these arithmetic operations are carried out in the MPU, with the result transmitted to the search unit as cell radius setup information.

Then, a direction for enlarging the search window is determined on the basis of the direction for rounding up the downlink transmission timing. FIG. 4 is configured to enlarge in forward and backward directions at the same time, independent of the direction of the round up. It is possible to discern the direction of enlargement based on the direction of the round up; thereby preventing an increase in process volume. FIG. 4 exemplifies a case of rounding up a transmission timing in a forward direction. In this case, it is a conceivable condition for a path to run backward over a search window; therefore, an enlargement of a X [chip] is carried out only in a backward direction. The MPU judges and arithmetically operates the round up direction and its amount.

In the meantime, FIG. 5 exemplifies a case of rounding up a transmission timing backwards. Contrary to the case in FIG. 4, in this case an enlargement of a X [chip] is carried out only in a forward direction.

It is also possible to hand an arithmetic operation result to a DHO origin's radio telecom base station by way of a radio network control apparatus. The direction of an enlargement at the radio telecommunication base station of a DHO origin is the reverse of the direction of an enlargement for the DHO destination. The range of the enlargement is the same, i.e., X [chip].

The following is a relationship between the enlargement direction of a cell radius at the respective radio telecommunication base stations and the round up direction of the transmission timing at the DHO destination's base station.

TABLE 1

| Base station | Forward round up | Backward round up |
| --- | --- | --- |
| Movement origin | Forward enlargement | Backward enlargement |
| Movement destination | Backward enlargement | Forward enlargement |

A radio telecommunication base station eventually left with a link receives a DHO completion notification from the mobile device or radio network control apparatus. In the case of receiving the completion notification from a mobile device, the notification is extracted from the lowest layer signal after decoding a channel. In the case of receiving a completion notification from a radio network control apparatus, the MPU receives a signal from the upper layer and discerns the DHO is complete.

Then, the enlarged cell radius is changed back to the original based on the DHO completion state, which is judged by receiving the DHO completion notification. Note that the fact that a path exists within an original cell radius is validated before changing back to the original, in lieu of changing back immediately. This judgment is carried out at the MPU. That is, because a control is carried out upon the completion of the DHO that moves the timing for receiving data from a mobile device gradually toward the center of a base station's search window, it becomes possible to receive the data from the mobile device without enlarging the cell radius as time elapses. As such, the cell radius is changed back to the original size by looking at the time at which the data from the mobile device could have been received, even with a smaller cell radius.

Figure 6:
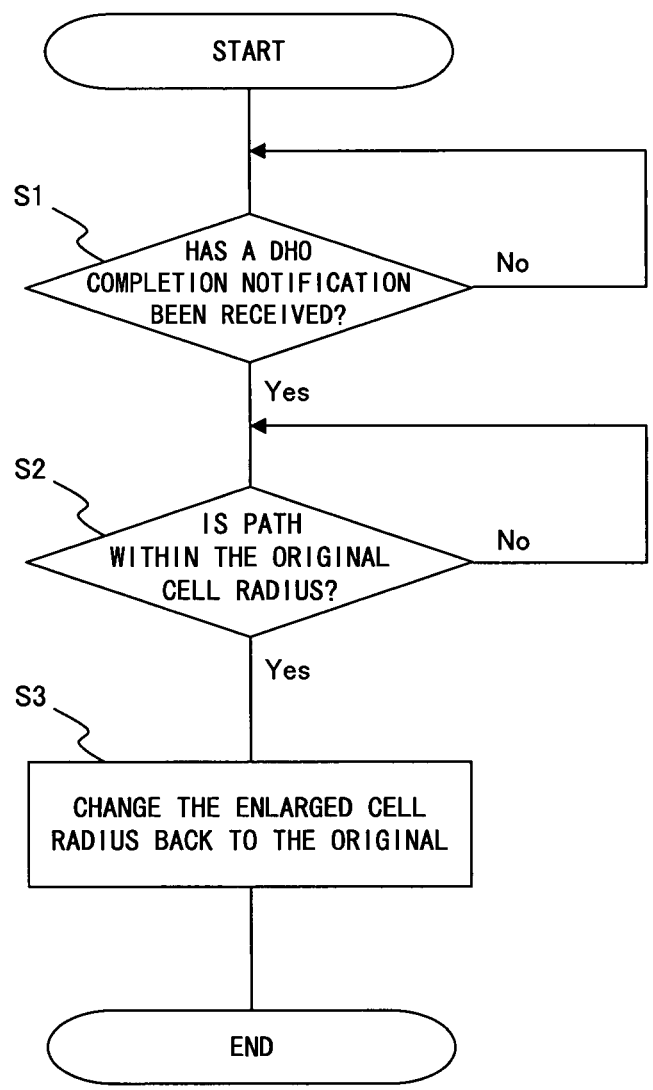
FIG. 6 is a flowchart diagram showing judgment conditions for reducing a cell radius.

FIG. 6 is a process flowchart for completing a DHO.

In step S1 (sometimes abbreviated as "S1" hereinafter), it is judges whether or not a DHO completion notification is received. If a DHO completion notification is not received, there is a wait until the DHO completion notification is received. If a DHO completion notification is received, it is judged whether or not a path for receiving data from the mobile device is within the original cell radius in S2. If the judgment of the S2 is "no", the judgment in S2 is repeated. If the judgment of the S2 is "yes", the enlarged cell radius is changed back to the original size.

FIGS. 7 through 10 are flowchart diagrams showing the overall process of a preferred embodiment of the present invention.

Figure 7:
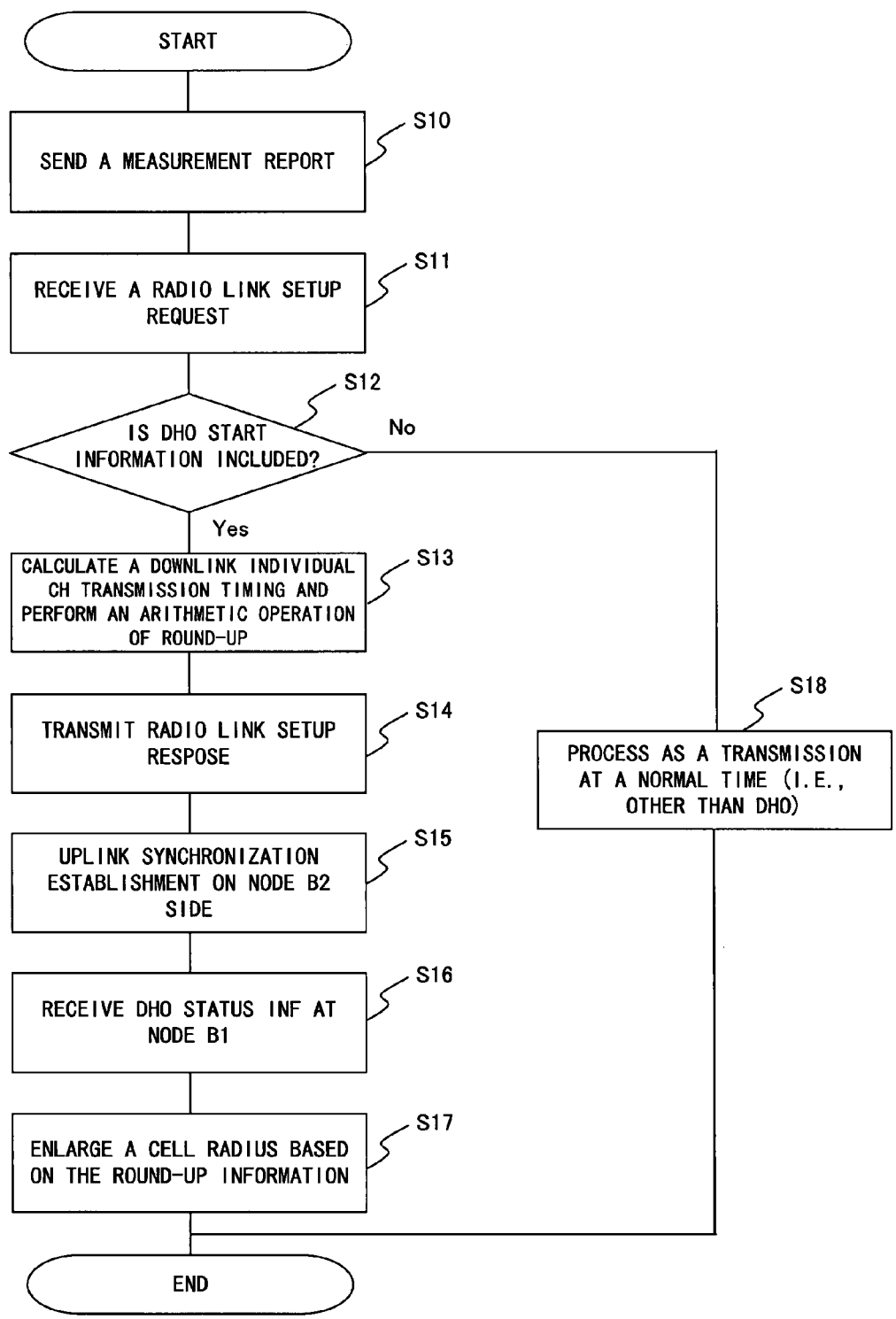
FIG. 7 is a flowchart diagram showing the overall process of a preferred embodiment of the present invention (part 1)

FIG. 7 is a flowchart at the beginning of a DHO. Signal names included in the flowchart are described in the later description of FIGS. 9 and 10.

It is assumed in FIG. 7 that the UE (i.e., a mobile device) which is communicating with a Node B1 (i.e., the base station 1) adds a new Node B2 (i.e., the base station 2). The present process flow exemplifies how both Node B1 and Node B2 carry out an enlargement of the cell radius associated with the round up of a DHO destination Node's B2 downlink transmission timing.

The step S10: the UE transmits a Measurement Report to the radio network controller (RNC).

S11: Movement destination Node B2 receives a Radio Link Setup Request.

S12: Judge on whether or not DHO start information is included in the Request. If the information is included, the judgment is an addition of an individual ch by a DHO. If the information is not included, a process is carried out to judge a common individual ch setup.

S13: Calculate the transmission timing of the downlink individual ch based on the Frame Offset and Chip Offset included in the Request. During this event, a round up process and an enlargement of the cell radius are carried out simultaneously. Also, the direction of round up that was carried out is memorized.

S14: Notify the RNC of a Response. Also noted is the round up information calculated in step S13.

S15: Carry out a downlink individual ch synchronization from Node B2 (at UE) and an uplink synchronization establishment at Node B2.

S16 and S17: Receive a DHO Status Information from the RNC at an addition origin Node B1. The present message includes round up information at Node B2, and a cell radius is enlarged at Node B1 based on the information.

S18: if the judgment at S12 is "no", a process is carried out as a transmission at normal time (i.e., other than a DHO).

FIG. 8 is a flowchart when a DHO is completed. Signal names included in the flowchart are described in FIGS. 9 and 10.

Here it is assumed that a UE is engaged in a telecom with a Node B1 adding a new Node B2. The present process flowchart exemplifies the flow when both Node B1 and Node B2 carry out an enlargement of the cell radius associated with the downlink round up of a DHO destination Node B2.

The step S20: The UE transmits a Management Report to the RNC.

S21: With an Active Set Update from the RNC as a trigger, the UE starts to delete Node B1.

S22: The Node B1 receives a NBAP and Q.aal2, and cuts off a radio link and an ATM link.

S23: The Node B2 receives a DHO status Information, thereby receiving from the RNC that the DHO has been completed.

S24: The process of changing the cell radius back to the original is started from the path timing.

S25: After confirming the fact that the path timing is within the normal reception window, the cell radius is changed back to its original size.

Next illustrates one example of using an upper layer (i.e., layers 2 and 3) signal during a handover to notify the start or completion of a DHO.

Figure 9:
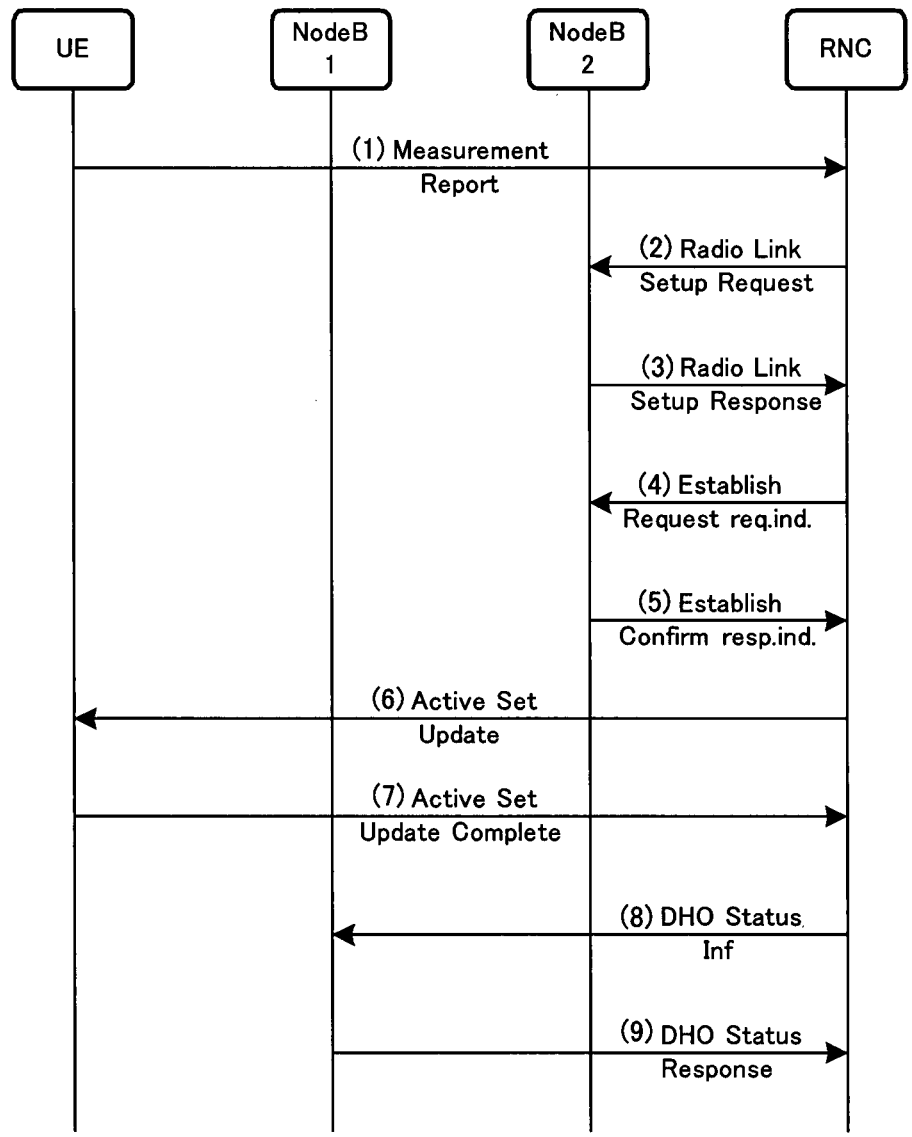
FIG. 9 is a flowchart diagram showing the overall process of a preferred embodiment of the present invention (part 3)

Here it is assumed that a mobile device carries out a handover from a base station 1 (i.e., Node B1) to a base station 2 (i.e., Node B2). When adding a base station, a movement origin base station and a movement destination base station need to be notified about the DHO start information in a certain method. Numerals (1) through (7) in FIG. 9 show a signal sequence at the time of adding a base station to a DHO.

The RNC judges whether or not to add a Node B2 based on the contents of the Measurement Report in numeral (1), which is reported from the mobile device; if the Node B2 is added, it notifies the Node B2 of a Radio Link Setup Request in numeral (2). After finishing a setup of the physical layer, in accordance with numeral (3), a synchronization of an ATM line is established by an Establish Request req in numeral (4). Numeral (5) illustrates a response message, which indicates that a synchronization has been successfully established. When completing a series of setups on Node B, numeral (6) Active Set Update is notified, and the mobile device shifts the operation to an establishment of a downlink synchronization based on the notification. It then transmits an uplink after establishing a synchronization. When a mobile device returns a response in numeral (7), the RNC judges the start of a DHO and transmits, a numeral (8), DHO Status Information to the movement origin base station. The movement origin base station receives numeral (8); thereby enabling it to judge whether or not there is a DHO start and apply the preferred embodiment of the present invention.

As for the addition destination base station, the RNC notes DHO start information within a numeral (2) Radio Setup Request, thereby enabling the start of a DHO to be judged.

The following lists the meaning of each signal:
(1) Measurement Report
An RRC protocol signal notified from a UE to the RNC by a DCCH.
OffTarget+Tm target=(SFNtarget−CFN) mod 256.
(2) Radio Link Setup Request
An NBAP protocol signal notified from the RNC to a Node B.
The Node B is requested to secure a new radio resource.
(3) Radio Link Setup Response
An NBAP protocol signal returned to the RNC when a radio link is successfully established.
(4) Establish Request req.ind
A Q.aal2 protocol signal for carrying out an ATM synchronization (e.g., VPI, VCI, et cetera) between the RNC and Node B.
(5) Establish Request resp.ind
An aal2 protocol signal returned to the RNC when an ATM synchronization is established
(6) Active Set Update
A RRC protocol signal for requesting an Active Set update of a connection between a UE and an UTRAN.
(7) Active Set Update Complete
An RRC protocol signal for notifying whether an update of an Active Set update has been completed.

Figure 10:
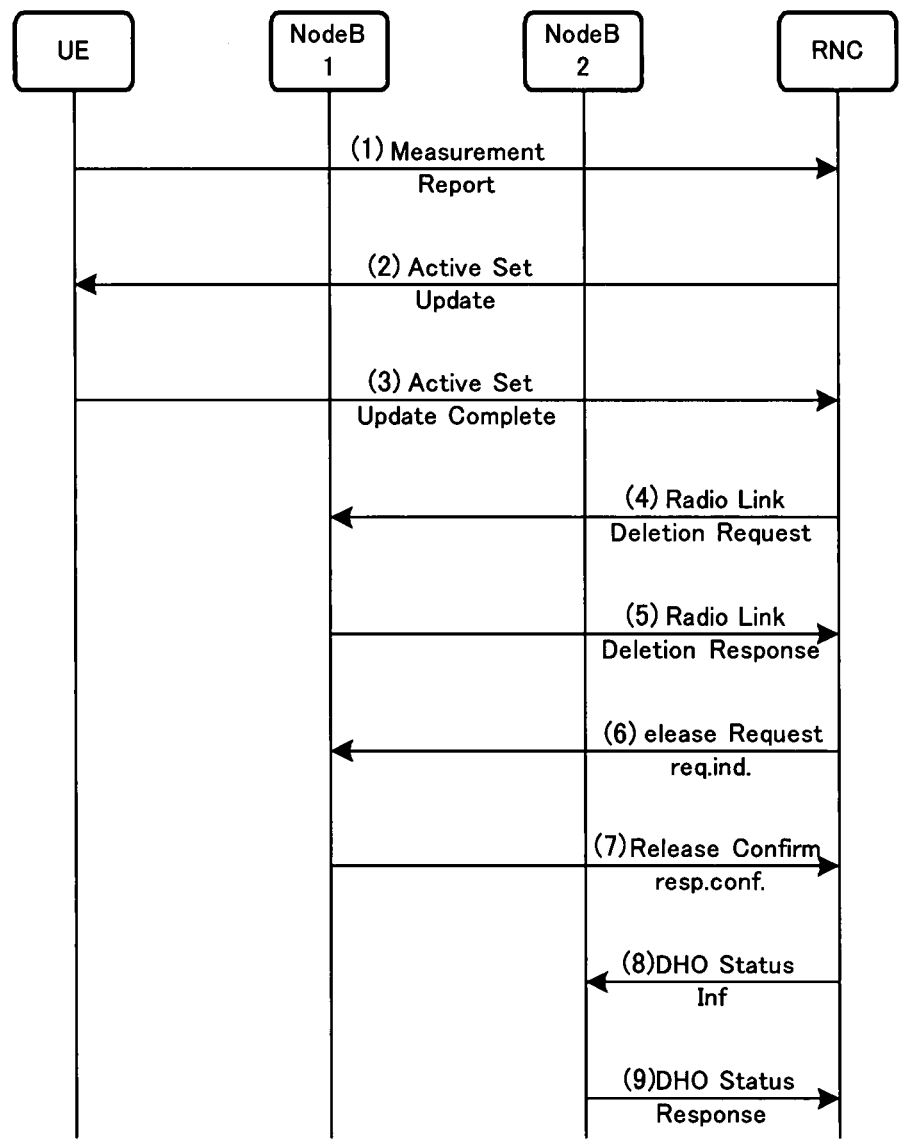
FIG. 10 is a flowchart diagram showing the overall process of a preferred embodiment of the present invention (part 4).

Next it is assumed that a mobile device is trying to delete a base station 1 during a handover between base station 1 (Node B1) and base station 2 (Node B2). It is necessary to use a certain method to notify the base station, which remains after all, of DHO completion information, when it is deleted. Numerals (1) through (7) in FIG. 10 show a signal sequence when deleting a base station during a DHO.

The RNC judges whether or not to delete the Node B1 based on the contents of the Measurement Report in numeral (1), which is reported from the mobile device. If the judgment is a deletion of the Node B1, the RNC first notifies the mobile device of the deletion in numeral (2) Active Set Up date. At this time, the mobile device ceases to receive a downlink data signal from the base station 1.

Then, RNC notifies Node B1 of the numeral (4) Radio Link Deletion Request, requests a release of a base station's physical layer resource. Upon completion of the physical layer's release process, the RNC requests a release of the ATM lines synchronization in a numeral (6) Release Request req.

After completing all of the procedures, the RNC notifies Node B2 of a numeral (8) DHO status, thereby notifying that the DHO has been completed. Node B2 is enabled to know whether the DHO has been completed by receiving a notification from numeral (8) and applying a preferred embodiment of the present invention.

Note that the above embodiment is described by exemplifying the W-CDMA system; another radio telecommunication system may be applied in lieu of being limited to the W-CDMA system.

What is claimed is:

1. A handover system, comprising:
    a processor configured to receive a notification indicating the start of a handover from a mobile device and one indicating the completion of said handover;
    to calculate the width of a search window for receiving data from said mobile device to be enlarged when receiving said notification indicating the start of said handover, and the width of said search window for receiving data from said mobile device to be reduced when receiving said notification indicating the completion of said handover; and
    to discern a direction of enlarging said search window from a direction of a round up if carrying out a process of rounding up a timing of transmitting data to said mobile device, wherein
    a handover source base station enlarges the search window in a forward direction and a handover destination station enlarges the search window in a backward direction when a forward rounding up to closer spreading code border of a timing of transmitting data is conducted in the mobile device, and the handover source base station enlarges the search window in a backward direction and the handover destination base station enlarges the search window in a forward direction when a backward rounding up to closer spreading code border of a timing of transmitting data is conducted in the mobile station.

2. The handover system according to claim 1, wherein an enlargement of the width of said search window is carried out at a base station of a movement destination of a mobile device.

3. The handover system according to claim 1, wherein an enlargement of the width of said search window is carried out at a base station of a movement origin of said mobile device.

4. The handover system according to claim 1, wherein said notification indicating the start and completion of said handover is received from said mobile device.

5. The handover system according to claim 1, wherein said handover system is equipped in a base station.

6. The handover system according to claim 5, wherein said notification indicating the start and completion of said handover is received from a radio network control apparatus.

7. The handover system according to claim 1, wherein the timing for reducing the width of said search window is the time at which the timing for receiving data from said mobile device is within said search window after a reduction.

8. A communication method for use in a base station, comprising:
    receiving a notification indicating the start of a handover from a mobile station and one indicating the completion of the handover;
    discerning a direction of enlarging said search window from a direction of a round up if carrying out a process of rounding up a timing of transmitting data to said mobile device; and
    enlarging the width of a search window for receiving data from the mobile station when receiving the notification indicating the start of the handover, and for reducing the width of the search window for receiving data from the mobile station when receiving the notification indicating the completion of the handover, wherein
    a handover source base station enlarges the search window in a forward direction and a handover destination station enlarges the search window in a backward direction when a forward rounding up to closer spreading code border of a timing of transmitting data is conducted in the mobile device, and the handover source base station enlarges the search window in a backward direction and the handover destination base station enlarges the search window in a forward direction when a backward rounding up to closer spreading code border of a timing of transmitting data is conducted in the mobile station.

9. A communication method for use in a communication system including a base station and a mobile station, the communication method comprising:
    transmitting, by the mobile station, a handover start notification at the time of starting a handover to a base station, and a handover complete notification at the time of completing said handover to the base station;

receiving, by the base station, a notification indicating the start of a handover from the mobile station and one indicating the completion of the handover;

discerning a direction of enlarging said search window from a direction of a round up if carrying out a process of rounding up a timing of transmitting data to said mobile device; and enlarging, by the base station, the width of a search window for receiving data from the mobile station when receiving the notification indicating the start of the handover, and for reducing the width of the search window for receiving data from the mobile station when receiving the notification indicating the completion of the handover, wherein a handover source base station enlarges the search window in a forward direction and a handover destination station enlarges the search window in a backward direction when a forward rounding up to closer spreading code border of a timing of transmitting data is conducted in the mobile device, and the handover source base station enlarges the search window in a backward direction and the handover destination base station enlarges the search window in a forward direction when a backward rounding up to closer spreading code border of a timing of transmitting data is conducted in the mobile station.

* * * * *